United States Patent
Tanaka et al.

(10) Patent No.: US 8,027,781 B2
(45) Date of Patent: Sep. 27, 2011

(54) INTERNAL COMBUSTION ENGINE CONTROL DEVICE AND INTERNAL COMBUSTION ENGINE CONTROL SYSTEM

(75) Inventors: Kensuke Tanaka, Hekinan (JP); Koji Tsutsumi, Anjo (JP); Xinyi Li, Nagoya (JP); Naoya Wakayama, Chita-gun (JP)

(73) Assignee: Denso Corporation, Kariya (JP)

( * ) Notice: Subject to any disclaimer, the term of this patent is extended or adjusted under 35 U.S.C. 154(b) by 235 days.

(21) Appl. No.: 12/573,244

(22) Filed: Oct. 5, 2009

(65) Prior Publication Data

US 2010/0088008 A1 Apr. 8, 2010

(30) Foreign Application Priority Data

Oct. 3, 2008 (JP) ................. 2008-257994

(51) Int. Cl.
*F02D 41/26* (2006.01)

(52) U.S. Cl. ........................ 701/110; 123/436
(58) Field of Classification Search .......... 701/103–105, 701/110; 123/435–436, 492, 493
See application file for complete search history.

(56) References Cited

U.S. PATENT DOCUMENTS 7,778,763 B2 * 8/2010 Ueda et al. ................... 701/104

FOREIGN PATENT DOCUMENTS

| EP | 2 031 232 | 3/2009 |
|----|-----------|--------|
| JP | 2007-231790 | 9/2007 |
| JP | 2010-84746 | * 4/2010 |

* cited by examiner

*Primary Examiner* — Hai H Huynh
(74) *Attorney, Agent, or Firm* — Nixon & Vanderhye PC

(57) ABSTRACT

An internal combustion engine control device has a torque increase amount obtaining section that obtains engine rotation speed fluctuation amount (output torque increase amount) caused with small quantity injection as a torque increase amount sensing value, an adaptation value setting section that variably sets an adaptation value used for engine control in accordance with a fuel property determined based on the torque increase amount sensing value, a confirmation injection control section that performs the small quantity injection again while the engine control is performed based on the set adaptation value, and an accuracy determination section that determines accuracy of fuel property determination result or the adaptation value based on whether a confirmation sensing value, which is the engine rotation speed fluctuation amount obtained when the confirmation injection control section performs the small quantity injection, is outside a predetermined range.

12 Claims, 5 Drawing Sheets

INTERNAL COMBUSTION ENGINE CONTROL DEVICE AND INTERNAL COMBUSTION ENGINE CONTROL SYSTEM

CROSS REFERENCE TO RELATED APPLICATION

This application is based an and incorporates herein by reference Japanese Patent Application No. 2008-257994 filed on Oct. 3, 2008.

BACKGROUND OF THE INVENTION

1. Field of the Invention

The present invention relates to an internal combustion engine control device that determines a property of fuel used for combustion in a compression ignition internal combustion engine (e.g., cetane number of light oil) and that controls an operation state of the internal combustion engine according to result of the determination and to a control system using the control device.

2. Description of Related Art

In a compression ignition internal combustion engine, a combustion state in a cylinder changes if a fuel property such as cetane number differs. Therefore, if an operation state of the internal combustion engine is controlled by adapting the control to fuel having a specific fuel property, there is a possibility of occurrence of a problem such as decrease of output torque or increase of a noise. For example, in a case where the operation state of the internal combustion engine is controlled by adapting the control to fuel having a specific cetane number, there occurs a problem of increase of a combustion noise if fuel having a higher cetane number than the specific cetane number is used. If fuel having a lower cetane number than the specific cetane number is used, there occurs a problem of decrease of output torque.

According to Patent document 1 (JP-A-2007-321706), an attention is paid to a phenomenon that a fluctuation amount of engine rotation speed (i.e., output torque increase amount) caused with injection increases as the cetane number increases. Therefore, a control device described in Patent document 1 determines the cetane number based on the fluctuation amount and controls the operation state of the internal combustion engine by variably setting adaptation values in accordance with the determined cetane number.

In a normal operation range, it is common to inject fuel at timing on an advanced side of a compression top dead center. Even if small quantity injection of fuel is performed at such the timing, change in the fluctuation amount corresponding to the cetane number does not appear notably (refer to Tb in FIG. 2). Therefore, the inventors of the present invention examined a scheme of performing the small quantity injection of the fuel at predetermined timing on a delayed side of the compression top dead center (referred to as delayed timing) and determining a fuel property based on output torque increase amount of the internal combustion engine caused with the small quantity injection. In the case where the fuel has a property of low ignitability (i.e., low cetane number), an ignition delay increases and the output torque increase amount becomes a very small value if the small quantity injection is performed at the delayed timing. In the case where the cetane number is high, even if the small quantity injection is performed at the delayed timing, the ignition occurs with the ignition delay similar to the delay in the case where the injection is performed before the compression top dead center and the output torque increase amount becomes a value similar to the value in the case where the injection is performed before the compression top dead center.

When the small quantity injection is performed at the delayed timing and the fuel property is determined based on the output torque increase amount at that time, a variation occurs in a sensing value of the output torque increase amount (i.e., a torque increase amount sensing value). Therefore, from a viewpoint of heightening accuracy of the fuel property determination, it is desirable to perform the small quantity injection multiple times and to obtain the multiple torque increase amount sensing values in order to compensate the variation. However, frequent execution of the small quantity injection causes problems of prolonged execution of an operation state with deteriorated exhaust emission and deterioration of fuel consumption. That is, there is a relationship of trade-off between inhibition of deterioration of accuracy of the fuel property determination and inhibition of deterioration of the exhaust emission and the fuel consumption.

SUMMARY OF THE INVENTION

It is an object of the present invention to provide an internal combustion engine control device for achieving both of inhibition of deterioration of accuracy of fuel property determination or an adaptation value and inhibition of deterioration of exhaust emission and fuel consumption.

According to a first example aspect of the present invention, a control device of a compression ignition internal combustion engine has a small quantity injection control section, a torque increase amount obtaining section, a fuel property determination section, an adaptation value setting section, a confirmation injection control section, and an accuracy determination section. The small quantity injection control section performs small quantity injection of fuel at predetermined timing (delayed timing) on a delayed side of a compression top dead center of the internal combustion engine to increase output torque of the internal combustion engine. The torque increase amount obtaining section obtains an increase amount of the output torque caused with the small quantity injection or physical quantity correlated with the increase amount as a torque increase amount sensing value. The fuel property determination section determines a fuel property (e.g., a cetane number) based on the torque increase amount sensing value. The adaptation value setting section variably sets an adaptation value used for control of the internal combustion engine in accordance with the fuel property determination result provided by the fuel property determination section. The confirmation injection control section performs the small quantity injection again while an operation state of the internal combustion engine is controlled based on the adaptation value set by the adaptation value setting section. The accuracy determination section determines accuracy of the fuel property determination result or the adaptation value based on whether a confirmation sensing value, which is the torque increase amount sensing value obtained when the confirmation injection control section performs the small quantity injection, is outside a predetermined range.

With such the construction, the fuel property is determined based on the torque increase amount sensing value at the time when the small quantity injection of the fuel is performed at the delayed timing. Therefore, the determination accuracy of the fuel property can be improved as compared to the case where the small quantity injection is performed at timing on an advanced side of the compression top dead center (i.e., at advanced timing). This scheme is based on knowledge of the inventors of the present invention that the difference in the torque increase amount sensing value corresponding to the fuel property appears more notably in the case where the injection is performed at the delayed timing than in the case where the injection is performed at the advanced timing.

Moreover, with the above construction, the adaptation value can be variably set (i.e., set provisionally) in accordance with the fuel property determination result without waiting until the torque increase amount sensing value is obtained multiple times to an extent that the accuracy of the fuel property determination becomes high. Accordingly, the deterioration of the exhaust emission and the fuel consumption due to the frequent execution of the small quantity injection can be inhibited. Moreover, in response to a concern about the low accuracy of the provisionally set adaptation value or the fuel property determination result, the small quantity injection is performed again while the internal combustion engine is controlled based on the provisionally set adaptation value, and the accuracy of the fuel property determination result or the adaptation value is determined (i.e., confirmed) based on the torque increase amount sensing value (i.e., the confirmation sensing value) obtained at the time when the small quantity injection is performed again. Thus, the deterioration of the accuracy of the fuel property determination or the adaptation value can be inhibited.

According to a second example aspect of the present invention, the control device as in the first example aspect of the present invention further has a correction section that corrects the fuel property determination result or the adaptation value based on the confirmation sensing value when the accuracy determination section determines that the confirmation sensing value is outside the predetermined range.

According to a third example aspect of the present invention, the control device as in the first example aspect of the present invention further has a follow-up small quantity injection request section that performs the small quantity injection again to obtain the torque increase amount sensing value, which is used for the determination by the fuel property determination section, again when the accuracy determination section determines that the confirmation sensing value is outside the predetermined range.

When the confirmation sensing value slightly deviates from the predetermined range, it is desirable to correct the fuel property determination result or the adaptation value using the already-performed small quantity injection and the torque increase amount sensing value at that time as in the above second example aspect of the present invention rather than performing the small quantity injection again. When the confirmation sensing value deviates largely from the predetermined range, it is difficult to correct the fuel property determination result or the adaptation value such that the sufficient accuracy is achieved. Therefore, in this case, it is desirable to perform the small quantity injection again and to obtain the torque increase amount sensing value again (i.e., newly) as in the above third example aspect of the present invention.

According to a fourth example aspect of the present invention, the predetermined range is set in two stages of a first range (refer to W1 of FIG. 5) and a second range (refer to W2 of FIG. 5), which is set narrower than the first range. The control device as in the first example aspect of the present invention further has a correction section that corrects the fuel property determination result or the adaptation value based on the confirmation sensing value when the accuracy determination section determines that the confirmation sensing value is inside the first range and outside the second range. The control device further has a follow-up small quantity injection request section that performs the small quantity injection again to obtain the torque increase amount sensing value, which is used for the determination by the fuel property determination section, again when the accuracy determination section determines that the confirmation sensing value is outside the first range.

With such the construction, the effects of the above second and third example aspects of the present invention can be exerted likewise.

According to a fifth example aspect of the present invention, the control device beforehand stores the torque increase amount sensing value, which is assumed to be obtained when the confirmation injection control section performs the small quantity injection on an assumption that an instrumental error of an actuator controlling an operation state of the internal combustion is a median of the instrumental error and the adaptation value is an optimum value, as an assumed reference value. The correction section corrects the fuel property determination result or the adaptation value in accordance with a difference between the torque increase amount sensing value, which is actually obtained when the confirmation injection control section performs the small quantity injection, and the reference value.

With such the construction, it can be easily realized to perform the correction with the correction section to improve the accuracy of the fuel property determination result or the adaptation value.

As illustrated in FIG. 2, even when the fuel property is the same, the torque increase amount sensing value (NE fluctuation amount in the example of FIG. 2) changes largely if the predetermined timing for performing the small quantity injection deviates. As a result, the determination accuracy of the fuel property determination value lowers. Even when there is no deviation in the small quantity injection timing, the determination accuracy lowers if a sensing error of the torque increase amount sensing value occurs.

In response to these problems, according to a sixth example aspect of the present invention, the fuel property determination section determines the fuel property based on the torque increase amount sensing values obtained for the respective small quantity injections performed at predetermined timings different from each other.

That is, in the example of FIG. 2, the torque increase amount sensing value at the time when the small quantity injection is performed at a time point T1 (as a predetermined timing) and the torque increase amount sensing value at the time when the small quantity injection is performed at a time point T2 (as a predetermined timing) different from T1 are obtained, and the fuel property is determined based on the multiple torque increase amount sensing values. Therefore, the influence of the deviation of the above-mentioned small quantity injection timing or the sensing error on the determination accuracy can be reduced. Eventually, lowering of the determination accuracy of the fuel property determination value can be inhibited.

In the case where the fuel property is determined based on the multiple torque increase amount sensing values, according to a seventh example aspect of the present invention, the fuel property determination section determines the fuel property based on an integration value (refer to a shaded area in FIG. 2) or a rate of change (refer to inclinations $\alpha 1$, $\alpha 2$, $\alpha 3$ in a period from T1 to T2 in FIG. 2) of a torque characteristic line (refer to lines L1, L2, L3 in FIG. 2) indicating a relationship between the predetermined timing and the torque increase amount sensing value.

According to an eighth example aspect of the present invention, the control device further has a pressure regulation section that regulates fuel pressure at the time when the small quantity injection is performed. The fuel property determination section determines the fuel property based on the torque increase amount sensing values at multiple fuel pressure values regulated at different pressure values by the pressure regulation section.

If the fuel pressure at the time when the small quantity injection is performed differs, the torque increase amount sensing value also changes. A mode of the change of the torque increase amount sensing value at that time differs depending on the fuel property. Therefore, the determination accuracy of the fuel property can be improved by determining the fuel property based on the torque increase amount sensing values obtained at the different fuel pressure values respectively.

According to a ninth example aspect of the present invention, the torque increase amount obtaining section obtains fluctuation amount of engine rotation speed caused with the small quantity injection as the torque increase amount sensing value.

Examples of the torque increase amount sensing value include a sensing value of a cylinder pressure senor that senses pressure inside a cylinder and the fluctuation amount of the engine rotation speed as in the ninth example aspect of the present invention. If the fluctuation amount of the engine rotation speed is used as the torque increase amount sensing value, cost can be reduced by eliminating the cylinder pressure sensor. However, sensing accuracy of the engine rotation speed fluctuation amount is lower than that of the cylinder pressure. Therefore, there arises a more significant concern about the deterioration of the accuracy of the fuel property determination or the adaptation value when the multiple fluctuation amounts (i.e., the torque increase amount sensing values) cannot be obtained.

Regarding this point, according to the ninth example aspect of the present invention, the first example aspect of the present invention is applied to the case where the fluctuation amount of the engine rotation speed is used as the torque increase amount sensing value. Therefore, the above-described effect of inhibiting the deterioration of the accuracy of the fuel property determination or the adaptation value can be exerted suitably.

According to a tenth example aspect of the present invention, the small quantity injection control section performs the small quantity injection in a deceleration no-injection time. With such the construction, the increase amount of the output torque caused with the small quantity injection can be obtained with high accuracy. Therefore, the inhibition of the accuracy deterioration of the fuel property determination or the adaptation value can be promoted.

In the deceleration no-injection time, it is required to control the operation state of the internal combustion engine to perform various compensations and corrections. For example, in the deceleration no-injection time, it is required to perform small quantity injection for sensing an instrumental error, an aging degradation and the like of the injector or to correct a sensing value of an airflow meter that senses intake quantity. Therefore, it is difficult to perform the small quantity injection defined in the first example aspect of the present invention sufficient times in the deceleration no-injection time, and there is a concern about the deterioration of the accuracy of the fuel property determination or the adaptation value.

Therefore, according to the tenth example aspect of the present invention, the first example aspect of the present invention is applied to the case where the small quantity injection is performed during the deceleration no-injection time. Accordingly, the above-described effect of inhibiting the deterioration of the accuracy of the fuel property determination or the adaptation value can be exerted suitably.

According to an eleventh example aspect of the present invention, an internal combustion engine control system has the above-described internal combustion engine control device and at least one of a fuel supply pump that pressurizes and pumps fuel, a common rail that accumulates the fuel pumped by the fuel supply pump, and an injector that injects the fuel accumulated in the common rail into a cylinder of the internal combustion engine. Such the internal combustion engine control system can exert the above-mentioned various effects similarly.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF EXAMPLE EMBODIMENTS

Hereafter, embodiments of the present invention will be described with reference to the drawings.

First Embodiment

Figure 1:
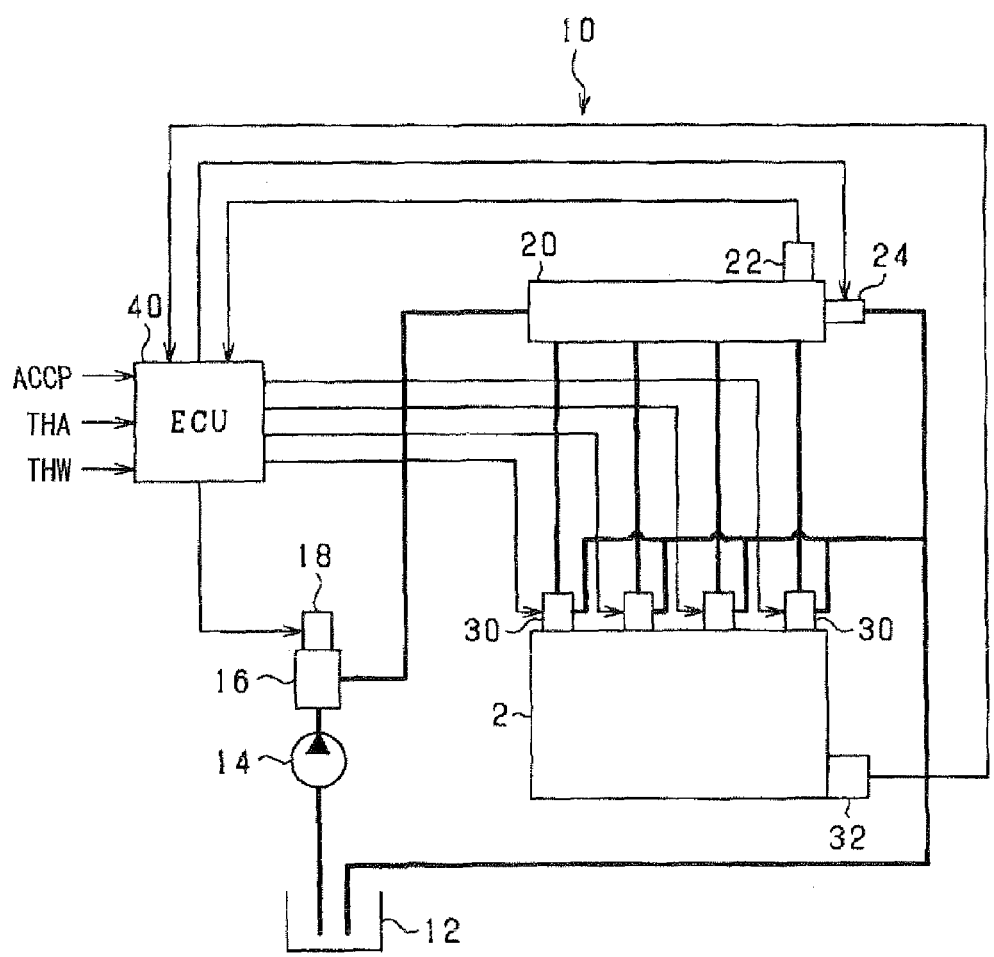
FIG. 1 is a diagram showing a fuel injection system of an engine according to a first embodiment of the present invention.

FIG. 1 is a schematic diagram showing a fuel injection system 10 of an engine 2 (a compression ignition internal combustion engine), which is a control object of an internal combustion engine control device according to a first embodiment of the present invention.

(Fuel Injection System 10)

The fuel injection system 10 according to the present embodiment is used to supply fuel to a four-cylinder diesel engine 2 of an automobile, for example. The fuel injection system 10 has a high-pressure pump 16 (a fuel supply pump) that supplies the fuel to a common rail 20, the common rail 20 that accumulates high-pressure fuel, injectors 30 that inject the high-pressure fuel supplied from the common rail 20 into combustion chambers of respective cylinders of the engine 2, and an ECU 40 (an electronic control unit) that controls the system 10. In order to supply the fuel from the high-pressure pump 16 to the common rail 20, the fuel injection system 10 has a feed pump 14 that draws the fuel from a fuel tank 12.

The high-pressure pump 16 as the fuel supply pump is a well-known pump that pressurizes the fuel suctioned into a pressurization chamber when a plunger reciprocates with rotation of a cam of a camshaft. The high-pressure pump 16 has a metering valve 18 (a pressure regulation device) that meters fuel quantity suctioned from the feed pump 14 in a suction stroke. The common rail 20 has a pressure sensor 22 that senses internal fuel pressure of the common rail 20 (i.e., common rail pressure) and a pressure reducing valve 24 that reduces the internal fuel pressure by returning the fuel in the common rail 20 toward the fuel tank 12. The injector 30 is a well-known electromagnetic valve that controls lifting of a nozzle needle, which opens and closes an injection hole, with pressure of a control chamber, for example.

As one of sensors for sensing an operation state, the engine 2 has a crank angle sensor 32 that senses engine rotation speed NE. Furthermore, as other sensors (not shown) for sensing the operation state, the fuel injection system 10 is equipped with an accelerator sensor that senses an accelerator operation amount by a driver (i.e., an accelerator position ACCP), a coolant temperature sensor that senses temperature of a coolant (i.e., coolant temperature THW), an intake temperature sensor that senses temperature of intake air (i.e., intake temperature THA) and the like.

The ECU 40 as a fuel property sensing device is constituted by a microcomputer mainly constituted by CPU, ROM, RAM, a flash memory and the like. The ECU 40 takes in sensing signals from the various sensors including the pressure sensor 22 provided to the common rail 20 and the crank angle sensor 32 provided to the engine 2 and controls the common rail pressure and fuel injection quantity and fuel injection timing of the injector 30. The ECU 40 commands the injector 30 to perform a multiple injection (a multi-stage injection) including a pilot injection, a post-injection and the like before and after a main injection in accordance with the operation state.

The ECU 40 calculates target pressure of the common rail 20 based on the operation state of the engine 2 and performs common rail pressure control for controlling energization of the metering valve 18 and the pressure reducing valve 24 such that the common rail pressure sensed with the pressure sensor 22 coincides with the target pressure. In addition, the ECU 40 calculates the fuel injection quantity and the fuel injection timing based on the operation state of the engine 2 and performs fuel injection control for opening the injector 30 of each cylinder at a predetermined timing and for a predetermined time based on the calculation result, thereby causing the injector 30 to inject and supply the fuel into the cylinder.

In the fuel injection control, the ECU 40 controls the multiple injection for performing the pilot injection, the post-injection and the like before and after the main injection. More specifically, the optimum injection mode is obtained beforehand as adaptation values based on the accelerator position ACCP equivalent to an engine load and the engine rotation speed NE through test, and the adaptation values are stored as a map (or maps) beforehand. For example, the adaptation values are the time number (i.e., stage number) of the injections per combustion cycle, the fuel injection quantity of each stage, the fuel injection timing of each stage, the rail pressure and the like. In addition to the adaptation values regarding the fuel injection, an adaptation value of quantity of exhaust gas recirculation for recirculating a part of exhaust gas to the intake air (i.e., EGR quantity) may be stored in the map. In the case where a supercharger that pressurizes the intake air has a supercharging pressure regulation function, an adaptation value of the supercharging pressure may be stored in the map. The adaptation values in the map are extracted based on the engine load, the engine rotation speed NE and the like at each time. Then, operations of the actuators controlling the operation state of the internal combustion engine (such as the injectors 30, the metering valve 18, an EGR quantity regulation valve (not shown) and the supercharger) are controlled to achieve the extracted adaptation values.

In the compression ignition diesel engine 2, a combustion state changes largely if ignitability of the fuel (i.e., the fuel property) differs. When the ignitability is high (i.e., when the cetane number is high), there is a concern about increase of a combustion noise. When the ignitability is low (i.e., when the cetane number is low), there is a concern about decrease of output torque. Therefore, the ECU 40 (as an adaptation value setting section) senses the cetane number as an index of the ignitability by sections explained below. Then, the ECU 40 corrects (i.e., variably sets) the various adaptation values in the map mentioned above based on the sensed cetane number.

The ECU 40 performs small quantity injection of the fuel at predetermined timing on a delayed side of a compression top dead center in a period in which the engine 2 is performing a deceleration no-injection operation and senses output torque increase amount (a torque sensing value Trq) caused with the small quantity injection. The torque sensing value Trq increases as the cetane number increases. Therefore, by sensing the torque sensing value Trq in this way, the cetane number or a sensing index V equivalent to the cetane number can be calculated. Therefore, the ECU 40 functions as sections explained below to calculate the sensing index V (or the cetane number) and corrects the adaptation values based on the sensing index V. The engine rotation speed NE slightly increases with the small quantity injection. In the present embodiment, the torque sensing value Trq is calculated based on the increase amount of the engine rotation speed NE (referred to as NE fluctuation amount, hereafter).

(Sensing Condition Determination Section)

The ECU 40 determines whether a deceleration no-injection time is present. The deceleration no-injection time is provided, for example, when the accelerator is released while the vehicle is running and is the time in which the fuel injection is cut and the engine rotation speed decreases at a constant rate. If it is determined that the deceleration no-injection time is present, the ECU 40 allows property sensing injection from the injector 30 in order to sense the fuel property. Since the above-mentioned NE fluctuation amount is smaller in the deceleration no-injection time than in the other operation state, the NE fluctuation amount can be sensed with high precision during the deceleration no-injection time. In addition to the deceleration no-injection time, an idle operation time, in which the fluctuation of the engine rotation speed NE is small, may be used as a condition for sensing the fuel property. Furthermore, a condition that the intake temperature THA and the coolant temperature THW are within predetermined temperature ranges that are not too low and not too high may be used as a condition for sensing the fuel property.

(Small Quantity Injection Control Section)

The ECU 40 commands the injector 30 to perform the property sensing injection (i.e., the small quantity injection) for sensing the fuel property when the condition for sensing the fuel property is satisfied. The injection stage number, the injection quantity and the injection timing of the property sensing injection are different from those of the normal fuel injection control. That is, the small quantity of the fuel (which is smaller than in the case of the idle operation time, for example) is injected in the single stage in the property sensing injection. In the small quantity injection of the present embodiment, the injector 30 is commanded to inject the quantity of several cubic millimeters per injection (for example, two cubic millimeters per injection).

Figure 2:
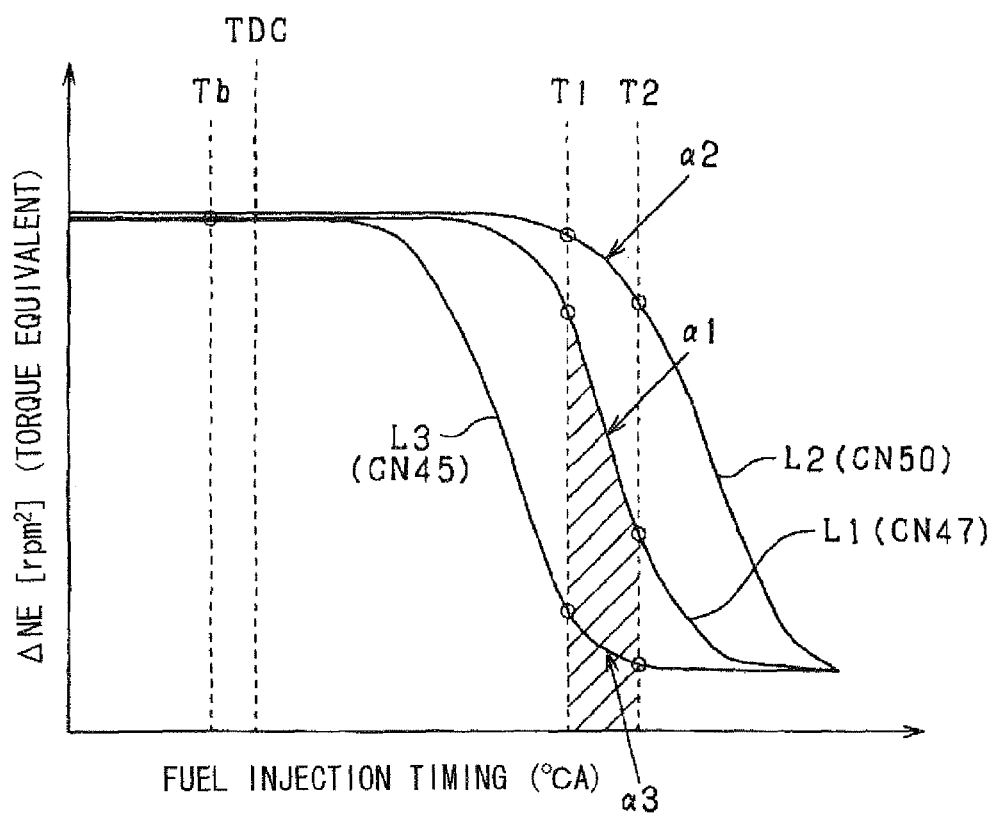
FIG. 2 is a diagram showing a relationship (a torque characteristic) between injection timing of small quantity injection and NE fluctuation amount according to the first embodiment.

Solid lines L1, L2 and L3 in FIG. 2 are graphs each showing a relationship (i.e., a torque characteristic) between the injection timing of the small quantity injection and the NE fluctuation amount ΔNE sensed at the time of the small quantity injection. The solid lines L1, L2 and L3 show that the sensed NE fluctuation amount ΔNE differs with the injection timing. The solid lines L1, L2, and L3 show the cases where the cetane number (CN) is 47, 50 and 45 respectively and show that the sensed NE fluctuation amount ΔNE differs also with the difference in the fuel property. ° CA in FIG. 2 means a crank angle degree.

The above difference in the NE fluctuation amount ΔNE caused by the difference in the fuel property is larger on the delayed side of the compression top dead center (TDC) than on an advanced side of the compression top dead center (TDC). In-cylinder temperature is high on the advanced side of the TDC, so a combustion state is stable on the advanced side of the TDC. Therefore, the ignition timing hardly changes on the advanced side of the TDC even if the cetane number differs. Accordingly, the magnitude of the torque generated by the small quantity injection (i.e., the NE fluctuation amount ΔNE) hardly changes even if the cetane number differs. Constantly thereto, the in-cylinder temperature is low and the combustion state is unstable on the delayed side of the TDC. Therefore, the ignition timing changes significantly on the delayed side of the TDC if the cetane number differs. Accordingly, the difference in the NE fluctuation amount ΔNE generated by the small quantity injection changes largely if the cetane number differs. Therefore, it is desirable that the ECU 40 performs the control to perform the small quantity injection at predetermined timing on the delayed side of the TDC (timings T1 and T2 in the example of FIG. 2). In this way, the fuel property can be sensed with high accuracy by performing the property sensing injection in an injection timing range where the difference in the NE fluctuation amount ΔNE generated by the small quantity injection increases with the difference in the cetane number.

(Torque Sensing Value Obtaining Section)

The ECU 40 senses the NE fluctuation amount ΔNE at the time of the execution of the small quantity injection from the engine rotation speed NE sensed with the rotation sensor. Even when the fuel property is the same, the sensed NE fluctuation amount ΔNE changes largely if the timing of the small quantity injection deviates from the predetermined timings T1, T2. Even when there is no deviation in the small quantity injection timing, the sensing accuracy of the NE fluctuation amount ΔNE lowers if a sensing error of the rotation sensor arises. Therefore, in the present embodiment, the single stage small quantity injection is performed at each of the multiple timings T1, T2 within the injection timing range mentioned above. Then, at least one of the torque sensing value Trq and the sensing index V is calculated based on the NE fluctuation amount ΔNE(T1) caused with the small quantity injection performed at the timing T1 and the NE fluctuation amount ΔNE(T2) caused with the small quantity injection performed at the timing T2. Hereafter, at least one of the torque sensing value Trq and the sensing index V will be referred to simply as the torque sensing value Trq or the sensing index V.

In the case where the small quantity injection is performed at the predetermined timing T1 or T2 in the injection timing range, if the engine rotation speed NE at the time of the small quantity injection differs, the intake air quantity differs and therefore the NE fluctuation amount ΔNE also differs. As contrasted thereto, when the small quantity injection is performed on the advanced side of the injection timing range, the NE fluctuation amount ΔNE takes substantially a constant value irrespective of the engine rotation speed NE at the time of the small quantity injection. According to the present embodiment paying attention to this point, the single stage small quantity injection is performed at timing Tb on the advanced side of the injection timing range (at timing on the advanced side of the TDC in the example of FIG. 2), and the sensing index V is calculated based on ratios of the NE fluctuation amounts ΔNE(T1), ΔNE(T2) to the NE fluctuation amount ΔNE(Tb) at that time as shown by a following formula (1).

$$V = \Delta NE(T1)/\Delta NE(Tb) + \Delta NE(T2)/\Delta NE(Tb) \quad (1)$$

The torque sensing value Trq can be estimated by a following formula (2) based on the engine rotation speed NE and the NE fluctuation amount ΔNE at the time when the small quantity injection is performed. k in the formula (2) represents a proportional constant. In this case, the estimated torque sensing value Trq may be used as the sensing index V.

$$Trq = k \times NE \times \Delta NE \quad (2)$$

(Fuel Property Determination Section)

The sensing index V takes a larger value as the fuel property has higher ignitability, i.e., higher cetane number. Therefore, the ECU 40 determines the cetane number based on the sensing index V calculated as above. The various adaptation values in the map mentioned above are corrected (i.e., variably set) in accordance with the determination result.

In such the fuel property determination, there is a concern about the lowering of the determination accuracy because of the deviation of the small quantity injection timing, the sensing error of the rotation sensor and the like as mentioned above. Therefore, when the NE fluctuation amounts ΔNE (T1), ΔNE(T2) are sensed by performing the small quantity injection at the predetermined timings T1, T2, it is desirable to perform the small quantity injection multiple times at each of the predetermined timings T1, T2 respectively and learn the multiple NE fluctuation amounts ΔNE(T1), ΔNE(T2) respectively. It is desirable to improve the determination accuracy by calculating the torque sensing value Trq (the sensing index V) based on the NE fluctuation amounts ΔNE (T1), ΔNE(T2) having accuracy improved by the learning.

However, the frequent execution of the small quantity injection causes problems of prolonged execution of the operation state with the deteriorated exhaust emission and deterioration of the fuel consumption. Moreover, in the execution period of the deceleration no-injection operation, it is required to control the operation state of the engine 2 to perform various compensations and corrections such as injector correction small quantity injection control explained below. Therefore, it is difficult to perform the small quantity injection for calculating the torque sensing value Trq (i.e., the property sensing injection) sufficient times, and there is a concern that the determination accuracy cannot be improved.

The injector correction small quantity injection control is to sense the rotation fluctuation caused with the small quantity injection and to correct an instrumental error variation and aging degradation of the injector 30 regarding command injection quantity and command injection timing based on the sensed rotation fluctuation. In the case of the property sensing injection, the small quantity injection is performed at the predetermined timings T1, T2, at which combustibility is low. In contrast, in the case of the injector correction small quantity injection, it is required to perform the small quantity injection at timing, at which the combustibility is high (e.g., timing on the advanced side of the TDC). Therefore, it is impossible to perform the small quantity injection doubling as the injector correction small quantity injection and the property sensing injection. However, there is a case where base small quantity injection at the timing Tb related to the property sensing injection can double as the injector correction small quantity injection.

Regarding the above-described concern about the improvement of the determination accuracy, in the present embodiment, if the small quantity injection is performed at least once at any of the timings T1, T2, Tb, the torque sensing value Trq (the sensing index V) is calculated as a provisional sensing value based on the NE fluctuation amount ΔNE(T1), ΔNE(T2) or ΔNE(Tb) obtained at the time of the small quantity injection. The various adaptation values are corrected based on the provisional sensing value, and the operations of the various actuators such as the injector 30 are controlled based on the corrected adaptation values, thereby controlling the operation state of the engine 2. After the sufficient learning data necessary for the injector correction are obtained by completing predetermined times of the execution of the injector correction small quantity injection, small quantity injection (i.e., small quantity injection for confirmation, or confirmation small quantity injection) is performed again at the predetermined timings T1, T2 in the deceleration no-injection period based on the corrected adaptation values.

The torque sensing value is calculated as a confirmation sensing value based on the NE fluctuation amount obtained at the time of the confirmation small quantity injection. Based on whether the calculated confirmation sensing value is outside a predetermined range, it is determined whether the corrected adaptation values are appropriate values, i.e., whether the provisional sensing value is an appropriate value. If it is determined that the provisional sensing value is an appropriate value, updating is performed by using the provisional sensing value as a formal sensing value without change. If it is determined that the provisional sensing value is not an appropriate value, the provisional sensing value is corrected or abandoned and the small quantity injection is newly performed to sense the NE fluctuation amount ΔNE and calculate the torque sensing value Trq.

Next, a procedure of confirmation control performed by the ECU 40 for confirming the appropriateness of the provisional sensing value as mentioned above will be explained with reference to flowcharts of FIGS. 3 and 4.

Figure 3:
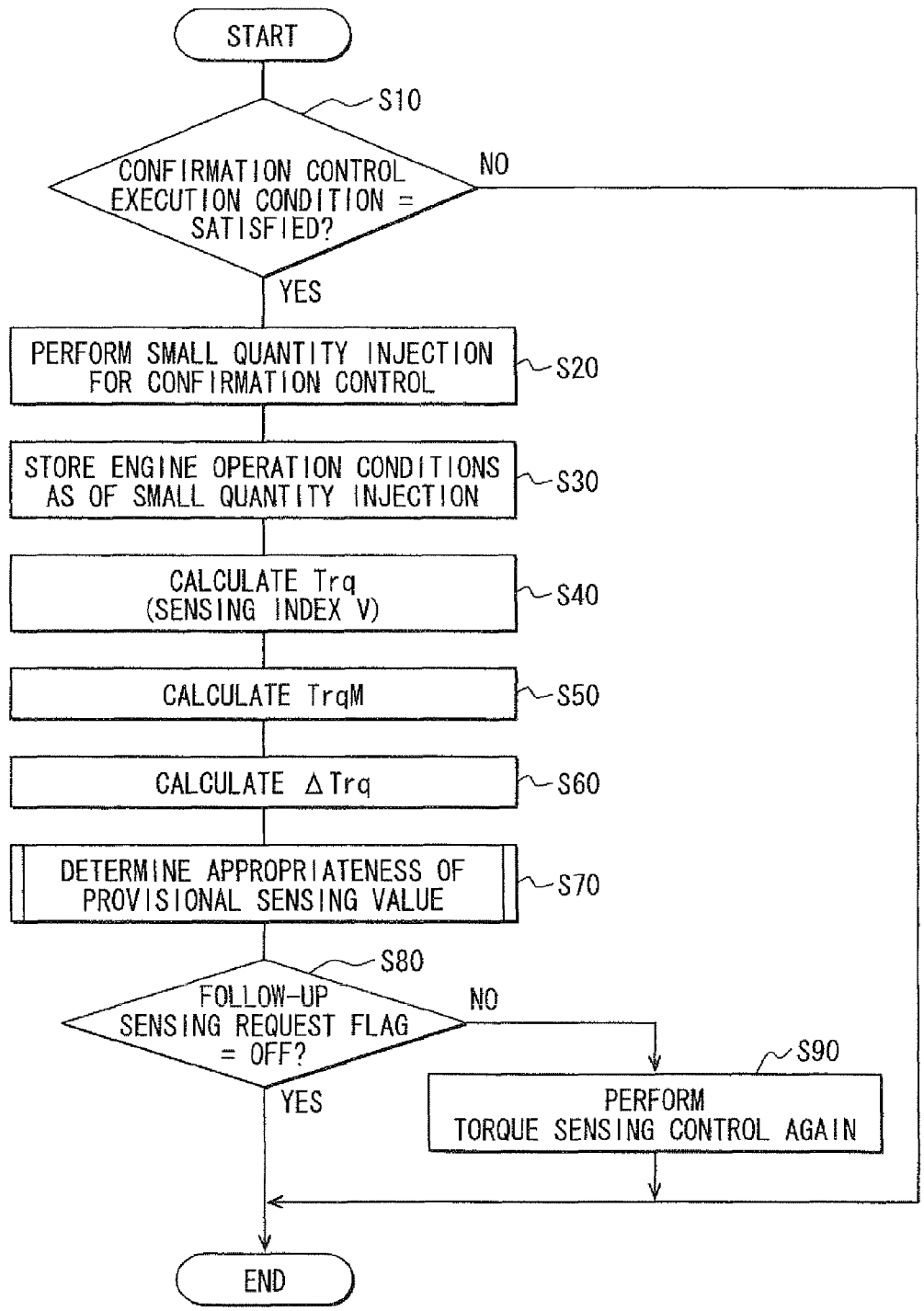
FIG. 3 is a flowchart showing an execution procedure of confirmation control according to the first embodiment.

First, in S10 of FIG. 3 (S means "Step"), it is determined whether a condition for executing the confirmation control is satisfied. It is determined that the confirmation control execution condition is satisfied when the various kinds of learning such as the injector correction small quantity injection other than the property determination small quantity injection have ended and the deceleration no-injection period is present. If it is determined that the execution condition is satisfied (S10: YES), the confirmation control small quantity injection is performed in following S20 (a confirmation injection control section). More specifically, a command is outputted to the injector 30 to perform the injection under the same condition as the condition of the control (referred to as torque sensing control, hereafter) at the time when the NE fluctuation amounts ΔNE(T1), ΔNE(T2) used for the calculation of the provisional sensing value are sensed based on the adaptation values corrected based on the provisional sensing value. That is, a command is outputted to the injector 30 to inject two cubic millimeters per injection at the predetermined timings T1, T2 respectively. This command is set based on the corrected adaptation values.

In following S30, engine operation conditions (such as the engine rotation speed NE, the coolant temperature THW and the intake temperature THA) at the time when the confirmation control small quantity injection is performed in S20 are stored. In following S40 (a torque, increase amount obtaining section), the torque sensing value Trq (the confirmation sensing value) is calculated based on the NE fluctuation amounts ΔNE(T1), ΔNE(T2) as mentioned above. In following S50, an instrumental error median TrqM of the torque sensing value is calculated based on the operation conditions stored in S30.

Next, the instrumental error median TrqM will be explained. The injector 30 has an instrumental error variation. In the present embodiment, when the various adaptation values are corrected based on the provisional sensing value, the correction is performed on an assumption that the instrumental error of the injector 30 is the median of instrumental error variation. If the various adaptation values are corrected into the optimum values based on the provisional sensing value, the torque sensing value sensed when the small quantity injection of the fuel (i.e., the confirmation control small quantity injection) is performed based on the corrected adaptation values can be assumed based on test or the like performed beforehand. That is, if the torque sensing value Trq (i.e., the confirmation sensing value) corresponding to the confirmation control small quantity injection is in a predetermined range with respect to the beforehand assumed value (i.e., an assumed reference value), it can be determined that the corrected adaptation values are appropriate or that the torque sensing value Trq used for the correction of the adaptation values is appropriate.

Figure 5:
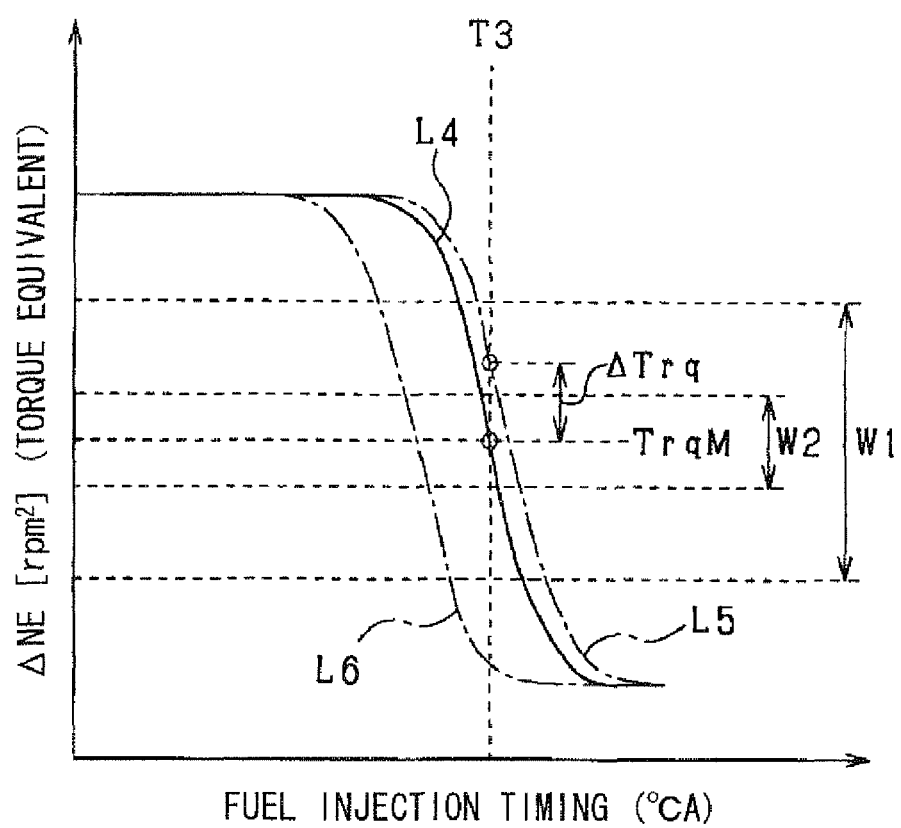
FIG. 5 is a diagram illustrating an instrumental error median used in the processing of FIG. 3.

A solid line L4 in FIG. 5 shows an assumed reference value. A relationship between the assumed reference value and the fuel injection timing is stored in a map. Even if the fuel injection timing is the same, the assumed reference value can take different values depending on the engine operation conditions. Therefore, the map is prepared for each of the operation conditions. A chained line L5 in FIG. 5 shows a confirmation sensing value in a case where the various adaptation values are not corrected appropriately because the cetane number is determined to be excessively high. A chained line L6 in FIG. 5 shows a confirmation sensing value in a case where the various adaptation values are not corrected appropriately because the cetane number is determined to be excessively low.

In S50, the instrumental error median TrqM is calculated from the assumed reference value L4 with reference to the map based on the fuel injection timing (T3 in the example of FIG. 5) at which the confirmation control small quantity injection is performed and the engine operation conditions stored in S30. It is desirable that the timing T3 of the confirmation control small quantity injection resides within an injection timing range, in which the difference in the NE fluctuation amount ΔNE caused by the small quantity injection enlarges with the difference in the cetane number. For example, it is desirable that the same timing as the small quantity injection timing T1 or T2 of the torque sensing control used for obtaining the provisional sensing value or middle timing between the small quantity injection timings T1 and T2 is used as the timing T3 of the confirmation control small quantity injection.

In following S60, difference ΔTrq between the torque sensing value Trq (i.e., the provisional sensing value) calculated in S40 and the instrumental error median TrqM calculated in S50 is calculated. In following S70 (an accuracy determination section), appropriateness (accuracy), i.e., whether the torque sensing value Trq (i.e., the provisional sensing value) is an appropriate value or whether the adaptation values corrected based on the provisional sensing value are appropriate values, is determined based on the difference ΔTrq calculated in S60.

Figure 4:
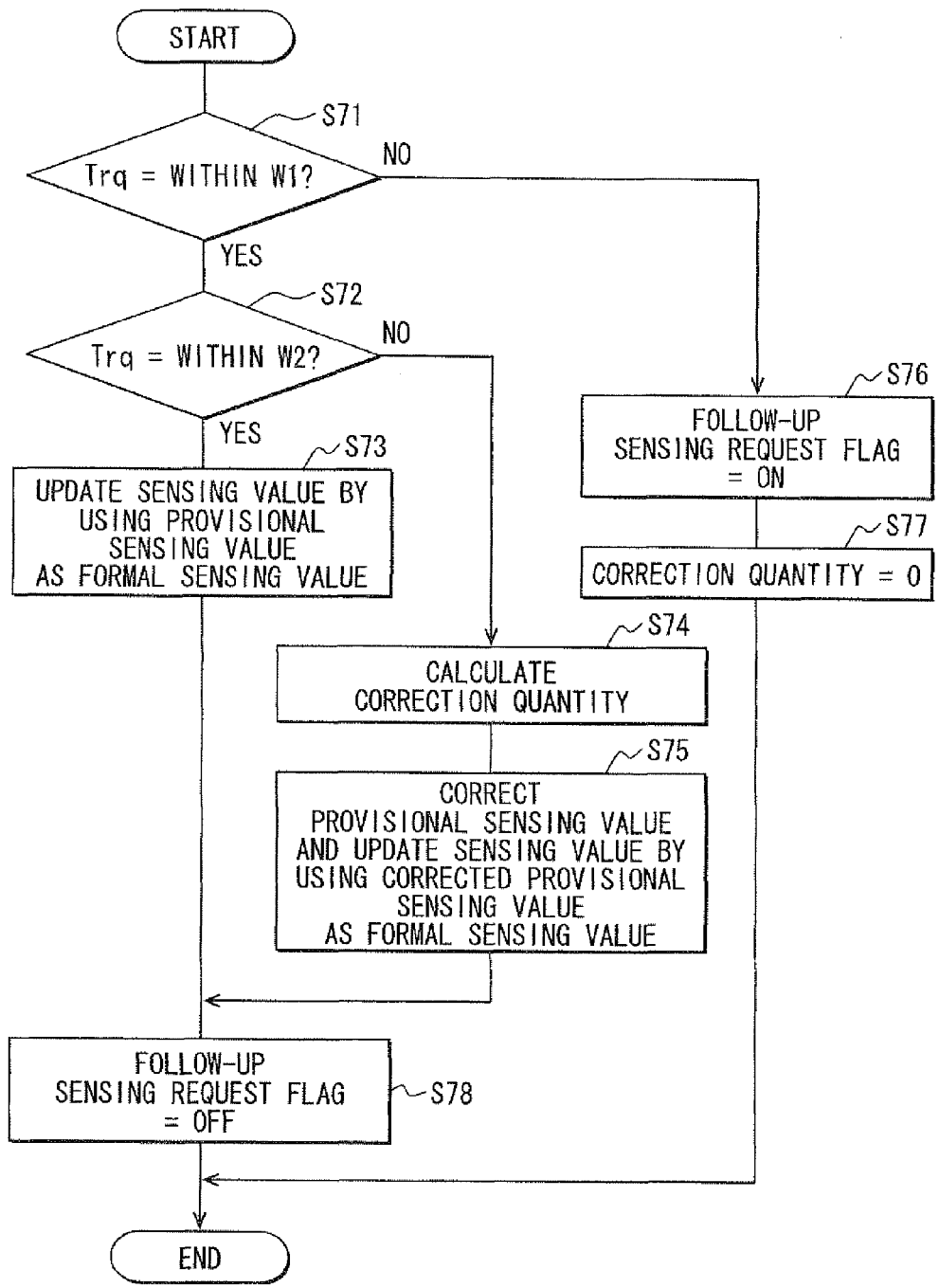
FIG. 4 is a flowchart showing sub routine processing of FIG. 3.

FIG. 4 shows subroutine processing of S70. Next, a processing procedure for determining the appropriateness of the provisional sensing value or the adaptation values will be explained.

First in S71, it is determined whether the difference ΔTrq calculated in S60 exists within a predetermined range. That is, in S71, it is determined whether the confirmation sensing value calculated in S40 exists within a first range W1 (refer to FIG. 5) set centering on the instrumental error median TrqM calculated in S50.

If it is determined that the difference ΔTrq exists within the predetermined range (S71: YES), i.e., if it is determined that the confirmation sensing value exists within the first range W1, the process proceeds to S72. In S72, it is determined whether the difference ΔTrq exists within a central setting range that is set as a narrower range than the above predetermined range. That is, in S72, it is determined whether the confirmation sensing value exists within a second range W2 (refer to FIG. 5) set centering on the instrumental error median TrqM. The second range W2 is set as a narrower range than the first range W1. The first range W1 is set between the maximum value and the minimum value of the assumed reference value L4.

If it is determined that the confirmation sensing value exists within the second range W2 (S72: YES), i.e., if it is determined that the confirmation sensing value is substantially on the solid line L4, it is assumed that the provisional sensing value is appropriate or that the adaptation values corrected based on the provisional sensing value are appropriate. In this case, updating is performed by using the provisional sensing value as the formal sensing value without change, i.e., without correcting the provisional sensing value. If it is determined that the confirmation sensing value exists within the first range W1 but is outside the second range W2 (S72: NO), e.g., if it is determined that the confirmation sensing value is on the chained line L5, correction quantity to the provisional sensing value or the adaptation values corrected based on the provisional sensing value is calculated in S74 based on the difference ΔTrq calculated in S60. More specifically, a relationship between the correction quantity and the difference ΔTrq is obtained by test and stored in a map beforehand, and the correction quantity is calculated based on the difference ΔTrq with reference to the map. In following S75 (a correction section), the provisional sensing value is corrected based on the correction quantity calculated in S74.

If it is determined in S71 that the confirmation sensing value is outside the first range W1 (S71: NO), e.g., if the confirmation sensing value is on the chained line L6, a follow-up sensing request flag is set at ON in following S76, and the correction quantity is reset to zero in following S77. If the update is made in S73 or S75 by using the provisional sensing value as the formal sensing value, the follow-up sensing request flag is set at OFF in S78. If the update is made using the provisional sensing value as the formal sensing value in this way, the adaptation values having been provisionally set by the correction based on the provisional sensing value are set again by the correction based on the formal sensing value.

In FIG. 3, if the follow-up sensing request flag is set at OFF (S80: YES) after the calculation processing of the correction quantity is performed in S70, a series of the processing of FIG. 3 is ended. If the follow-up sensing request flag is set at ON (S80: NO), the torque sensing control is performed again in following S90 (a follow-up small quantity injection request section) to obtain the provisional sensing value again.

The present embodiment described above exerts following effects.

(1) If the small quantity injection is performed at least once at any of the timings T1, T2, Tb, the torque sensing value Trq (the sensing index V) is calculated as the provisional sensing value based on the NE fluctuation amount ΔNE(T1), ΔNE(T2) or ΔNE(Tb) obtained at the time of the small quantity injection, and the various adaptation values are corrected based on the provisional sensing value. Accordingly, the various adaptation values can be corrected and set (i.e., set provisionally) based on the torque sensing value Trq (i.e., the provisional sensing value) without waiting until the torque sensing value Trq is obtained multiple times. Therefore, the deterioration of the exhaust emission and the fuel consumption due to the frequent execution of the small quantity injection can be inhibited. Moreover, in response to a concern about low accuracy of the provisional sensing value or the provisionally-set adaptation values, the small quantity injection is performed again while the engine is controlled based on the provisionally-set adaptation values, and the accuracy (the appropriateness) of the provisional sensing value or the provisionally-set adaptation values is confirmed based on the confirmation sensing value obtained when the small quantity injection is performed again. Therefore, the deterioration of the accuracy of the provisional sensing value or the provisionally-set adaptation values can be inhibited.

(2) The fuel property is determined based on the torque sensing value Trq at the time when the small quantity injection is performed at the delayed timing on the delayed side of the TDC. Therefore, the determination accuracy of the fuel property can be improved as compared to the case where the small quantity injection is performed at the advanced timing on the advanced side of the TDC.

(3) In the case where the confirmation sensing value slightly deviates from the instrumental error median TrqM (e.g., in the case of the chained line L5 of FIG. 5), the provisional sensing value is corrected based on the difference ΔTrq without performing the torque sensing control again. Therefore, the accuracy of the various adaptation values can be improved using the torque sensing value Trq obtained by the torque sensing control that has been already performed. Therefore, increase of the execution time number of the small quantity injection can be inhibited.

(4) In the case where the confirmation sensing value largely deviates from the instrumental error median TrqM (e.g., in the case of the chained line L6 of FIG. 5), the torque sensing value Trq is obtained again by performing the torque sensing control again. Therefore, sufficient accuracy of the provisional sensing value or the provisionally-set adaptation values can be secured.

(5) When the torque sensing value Trq is calculated by the torque sensing control, the small quantity injection is performed at the multiple timings T1, T2, and the torque sensing value Trq is calculated based on the NE fluctuation amounts ΔNE(T1), ΔNE(T2) obtained by the respective small quantity injections. Therefore, a more accurate torque sensing value Trq can be obtained than in the case where the torque sensing value Trq is calculated based on the NE fluctuation amounts obtained by two times of the small quantity injections performed at the same timing, for example.

Second Embodiment

Next, a second embodiment of the present invention will be explained.

In the above first embodiment, the sensing index V is calculated based on the formula (1). In the second embodiment, the sensing index V is calculated by following methods.

(a) Torque at Predetermined Injection Timing:

NE fluctuation amount (referred to simply as torque, hereafter) sensed using the small quantity injection of the torque sensing control is compared with a predetermined torque value. Thus, whether the cetane number is a high cetane number level or a low cetane number level is calculated as the sensing index. Alternatively, the torque generated by the small quantity injection may be compared with multiple predetermined torque values, and the fuel property may be calculated in multiple levels.

(b) Injection Timing at Predetermined Torque Value:

The torque is obtained using the small quantity injections performed at different injection timings, and the injection timing at which the obtained torque crosses a predetermined torque value is calculated as the sensing index.

(c) Inclination of Torque:

As shown in FIG. 2, the torque characteristic line indicating the relationship between the injection timing and the torque differs if the fuel property differs. A range where the difference in the torque generated by the small quantity injection enlarges with the difference in the cetane number exists on the delayed side of the TDC. An inclination $\alpha 1$, $\alpha 2$, $\alpha 3$ (refer to FIG. 2) of the torque characteristic line in this range becomes more gentle as the cetane number increases. Therefore, the sensing index is calculated based on an inclination of a straight line connecting two points of the torque at the injection timing T1 and the torque at the injection timing T2. In this case, an influence of the sensing error of the torque on the calculation result of the sensing index is reduced as compared to the case where the sensing index is calculated based on torque sensed at a single point. Therefore, the calculation accuracy of the sensing index improves.

Inclinations of multiple pairs of points may be sensed as the inclinations of the torque. In this case, the sensing points of the torque increases, so further improvement of the calculation accuracy of the sensing index is expected.

(d) Inclinations of Torque at Different Injection Quantities:

The inclinations $\alpha 1$, $\alpha 2$, $\alpha 3$ of the characteristic lines mentioned above change in accordance with the injection quantity. Therefore, the small quantity injections of different injection quantities are performed at the same injection timing, and the inclinations are sensed for the respective injection quantities. The sensing index is calculated based on the multiple sensed inclinations. Thus, the sensing index can be calculated with high accuracy.

(e) Integration Value of Torque:

In the range where the difference in the torque generated by the small quantity injection increases with the difference in the cetane number, an integration value of the torque characteristic line L1 (i.e., a shaded area in FIG. 2) is different from an integration value of the torque characteristic line L2 or L3. That is, the integration value differs in accordance with the cetane number. Therefore, the sensing index is calculated based on the integration value. In this case, the influence of the sensing error of the torque on the calculation result of the sensing index is reduced as compared to the case where the sensing index is calculated based on torque sensed at a single point. Therefore, the calculation accuracy of the sensing index improves.

Other Embodiments

The present invention is not limited to the above-described embodiments. Characteristic constructions of the respective embodiments may be combined in an arbitrary manner. The above described embodiments may be modified and implemented as follows, for example.

In the above-described first embodiment, if the small quantity injection is performed at least once at any of the timings T1, T2, Tb, the torque sensing value Trq (the provisional sensing value) is calculated and set based on the NE fluctuation amount $\Delta NE(T1)$, $\Delta NE(T2)$ or $\Delta NE(Tb)$ obtained at the time of the small quantity injection. Alternatively, completion of execution of predetermined time number of the small quantity injections may be waited for, and then the provisional sensing value may be set based on the NE fluctuation amounts obtained at the times of the respective small quantity injections.

In the above-described first embodiment, the provisional sensing value or the adaptation values corrected based on the provisional sensing value are corrected based on the correction quantity calculated in S74. Alternatively, the fuel property calculated based on the provisional sensing value may be corrected and the adaptation values may be set based on the corrected fuel property.

In the above-described first embodiment, the small quantity injection of the torque sensing control used for the calculation of the confirmation sensing value or the provisional sensing value is performed during the deceleration no-injection time. Alternatively, the small quantity injection may be performed during a steady operation time (for example, an idle operation time), in which the engine rotation speed and the engine load are stable.

In the above-described first embodiment, when the appropriateness of the provisional sensing value or the corrected adaptation values is confirmed, the appropriateness is confirmed based on the output torque (the NE fluctuation amount) at the time when the engine control is performed using the corrected adaptation values. Alternatively, the appropriateness may be confirmed based on an exhaust emission state at the time when the engine control is performed using the corrected adaptation values. That is, if the corrected adaptation values are appropriate values, a property value related to the exhaust emission (for example, NOx quantity, HC quantity or particulate matter quantity in the exhaust gas) should indicate quantity existing within a desired range. Therefore, the appropriateness of the provisional sensing value or the corrected adaptation values may be confirmed based on whether the property value is within the desired range.

When the appropriateness of the provisional sensing value or the corrected adaptation values is confirmed, both of the confirmation based on the output torque and the confirmation based on the property value related to the exhaust emission mentioned above may be performed.

In the above-described first embodiment, when the appropriateness of the provisional sensing value or the corrected adaptation values is confirmed based on output torque, the NE fluctuation amount is calculated as the output torque equivalent (i.e., the torque sensing value Trq). Alternatively, for example, a cylinder pressure sensor for sensing pressure inside the engine cylinder may be provided and the output torque equivalent may be calculated based on a sensing value of the cylinder pressure sensor.

While the invention has been described with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A control device of a compression ignition internal combustion engine comprising:
a small quantity injection control means for performing small quantity injection of fuel at predetermined timing on a delayed side of a compression top dead center of the internal combustion engine to increase output torque of the internal combustion engine;

a torque increase amount obtaining means for obtaining an increase amount of the output torque caused with the small quantity injection or physical quantity correlated with the increase amount as a torque increase amount sensing value;

a fuel property determination means for determining a fuel property based on the torque increase amount sensing value;

an adaptation value setting means for variably setting an adaptation value used for control of the internal combustion engine in accordance with the fuel property determination result provided by the fuel property determination means;

a confirmation injection control means for performing the small quantity injection again while an operation state of the internal combustion engine is controlled based on the adaptation value set by the adaptation value setting means; and an accuracy determination means for determining accuracy of the fuel property determination result or the adaptation value based on whether a confirmation sensing value, which is the torque increase amount sensing value obtained when the confirmation injection control means performs the small quantity injection, is outside a predetermined range.

2. The control device as in claim 1, further comprising:
a correction means for correcting the fuel property determination result or the adaptation value based on the confirmation sensing value when the accuracy determination means determines that the confirmation sensing value is outside the predetermined range.

3. The control device as in claim 2, wherein
the control device beforehand stores the torque increase amount sensing value, which is assumed to be obtained when the confirmation injection control means performs the small quantity injection on an assumption that an instrumental error of an actuator controlling an operation state of the internal combustion is a median of the instrumental error and the adaptation value is an optimum value, as an assumed reference value, and the correction means corrects the fuel property determination result or the adaptation value in accordance with a difference between the torque increase amount sensing value, which is actually obtained when the confirmation injection control means performs the small quantity injection, and the reference value.

4. The control device as in claim 1, further comprising:
a follow-up small quantity injection request means for performing the small quantity injection again to obtain the torque increase amount sensing value, which is used for the determination by the fuel property determination means, again when the accuracy determination means determines that the confirmation sensing value is outside the predetermined range.

5. The control device as in claim 1, wherein the predetermined range is set in two stages of a first range and a second range, which is set narrower than the first range, the control device comprising:
a correction means for correcting the fuel property determination result or the adaptation value based on the confirmation sensing value when the accuracy determination means determines that the confirmation sensing value is inside the first range and outside the second range; and a follow-up small quantity injection request means for performing the small quantity injection again to obtain the torque increase amount sensing value, which is used for the determination by the fuel property determination means, again when the accuracy determination means determines that the confirmation sensing value is outside the first range.

6. The control device as in claim 5, wherein
the control device beforehand stores the torque increase amount sensing value, which is assumed to be obtained when the confirmation injection control means performs the small quantity injection on an assumption that an instrumental error of an actuator controlling an operation state of the internal combustion is a median of the instrumental error and the adaptation value is an optimum value, as an assumed reference value, and the correction means corrects the fuel property determination result or the adaptation value in accordance with a difference between the torque increase amount sensing value, which is actually obtained when the confirmation injection control means performs the small quantity injection, and the reference value.

7. The control device as in claim 1, wherein
the fuel property determination means determines the fuel property based on the torque increase amount sensing values obtained for the respective small quantity injections performed at predetermined timings different from each other.

8. The control device as in claim 7, wherein
the fuel property determination means determines the fuel property based on an integration value or a rate of change of a torque characteristic indicating a relationship between the predetermined timing and the torque increase amount sensing value.

9. The control device as in claim 1, further comprising:
a pressure regulation means for regulating fuel pressure at the time when the small quantity injection is performed, wherein
the fuel property determination means determines the fuel property based on the torque increase amount sensing values at multiple fuel pressure values regulated at different pressure values by the pressure regulation means.

10. The control device as in claim 1, wherein
the torque increase amount obtaining means obtains fluctuation amount of engine rotation speed caused with the small quantity injection as the torque increase amount sensing value.

11. The control device as in claim 1, wherein
the small quantity injection control means performs the small quantity injection in a deceleration no-injection time.

12. An internal combustion engine control system comprising:
the internal combustion engine control device as in claim 1; and
at least one of a fuel supply pump that pressurizes and pumps fuel, a common rail that accumulates the fuel pumped by the fuel supply pump, and an injector that injects the fuel accumulated in the common rail into a cylinder of the internal combustion engine.

* * * * *